United States Patent
Loccufier et al.

(10) Patent No.: US 12,173,119 B2
(45) Date of Patent: Dec. 24, 2024

(54) AMINE FUNCTIONALIZED SILOXANE RESIN PARTICLES

(71) Applicant: AGFA NV, Mortsel (BE)

(72) Inventors: Johan Loccufier, Mortsel (BE); Luc Decoster, Mortsel (BE)

(73) Assignee: Agfa NV, Mortsel (BE)

( * ) Notice: Subject to any disclaimer, the term of this patent is extended or adjusted under 35 U.S.C. 154(b) by 223 days.

(21) Appl. No.: 17/923,024

(22) PCT Filed: Apr. 27, 2021

(86) PCT No.: PCT/EP2021/060883
§ 371 (c)(1),
(2) Date: Nov. 3, 2022

(87) PCT Pub. No.: WO2021/224051
PCT Pub. Date: Nov. 11, 2021

(65) Prior Publication Data
US 2023/0159709 A1     May 25, 2023

(30) Foreign Application Priority Data
May 5, 2020 (EP) .................................... 20172949

(51) Int. Cl.
C08G 77/26 (2006.01)
C09D 11/32 (2014.01)
C09D 11/38 (2014.01)

(52) U.S. Cl.
CPC .............. *C08G 77/26* (2013.01); *C09D 11/32* (2013.01); *C09D 11/38* (2013.01)

(58) Field of Classification Search
CPC . B01J 13/14; B01J 13/20; C08L 31/02; C08L 83/08; C08G 77/26; C09D 11/101; C09D 11/32; C09D 11/38; C09D 11/40; C09D 11/54; C09D 183/08
See application file for complete search history.

(56) References Cited

U.S. PATENT DOCUMENTS

| | | | |
|---|---|---|---|
| 6,037,390 A | 3/2000 | Page et al. | |
| 6,482,969 B1 | 11/2002 | Helmrick et al. | |
| 2004/0050293 A1 | 3/2004 | Arase et al. | |
| 2012/0238666 A1* | 9/2012 | Iezzi .................... | C09D 163/00 523/400 |

FOREIGN PATENT DOCUMENTS

| | | | |
|---|---|---|---|
| EP | 0856566 A1 | 8/1998 | |
| EP | 0940456 A1 | 9/1999 | |
| EP | 1010739 A1 | 6/2000 | |
| EP | 1125760 A1 | 8/2001 | |
| EP | 1362904 A1 | 11/2003 | |
| JP | 2004-174834 A | 6/2004 | |
| WO | WO 2008/138726 A2 | 11/2008 | |
| WO | WO2020079097 * | 4/2020 | ............. C08G 18/40 |

OTHER PUBLICATIONS

European Patent Office, International Search Report in International Patent Application No. PCT/EP2021/060883, mailed Jun. 30, 2021, 4 pp.
European Patent Office, Written Opinion in International Patent Application No. PCT/EP2021/060883, mailed Jun. 30, 2021, 6 pp.
U.S. Appl. No. 17/922,625, filed Nov. 1, 2022.
U.S. Appl. No. 17/922,628, filed Nov. 1, 2022.
U.S. Appl. No. 17/922,818, filed Nov. 2, 2022.
U.S. Appl. No. 17/922,820, filed Nov. 2, 2022.

\* cited by examiner

*Primary Examiner* — Anh T Vo
(74) *Attorney, Agent, or Firm* — Leydig, Voit & Mayer, Ltd.

(57) ABSTRACT

An amino functionalized siloxane resin particle obtainable by polycondensation of a cationic alkoxysilane surfactant according to general formula I (I) and an amino functionalized alkoxysilane according to general formula (II). The amino functionalized siloxane resin particle can be incorporated in jettable liquids for inkjet printing.

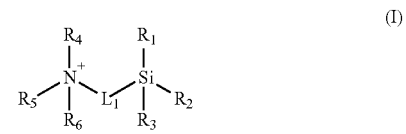
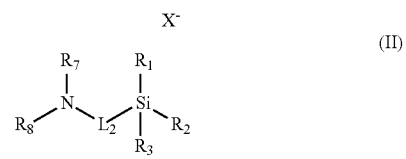

20 Claims, No Drawings

AMINE FUNCTIONALIZED SILOXANE RESIN PARTICLES

CROSS-REFERENCE TO RELATED APPLICATIONS

This patent application is the U.S. national phase of copending International Patent Application No. PCT/EP2021/060883, filed Apr. 27, 2021, which claims the benefit of European Patent Application No. 20172949.8, filed May 5, 2020.

TECHNICAL FIELD

The present invention relates to amine functionalized siloxane resin particle for ink jet applications.

BACKGROUND ART

Ink jet images have to withstand ever more harsh conditions, as ink jet is no longer limited to imaging applications and is evolving towards an industrial manufacturing technique where also functional elements have to be printed. Industrial applications often require high solvent resistance, excellent adhesion and scratch resistance, making UV curable technology the most obvious choice for these applications. However, there is an increasing interest in water based ink jet technology also in industrial environments because aqueous inkjet inks do not require specific curing equipment. Therefore, technology has to be designed capable of meeting the harsh demands of industrial applications, while being compatible with aqueous ink jet inks.

In conventional technology, sol-gel based coatings have been applied to create excellent physical properties. Sol-gel technology is based on the hydrolysis of metal and semi-metal alkoxides followed by condensation of the hydrolysed precursors. Alkoxysilanes are particularly preferred, as they allow to introduce a broad scope of functional groups, while being better controllable compared to other metal alkoxides such as aluminates, titanates and zirconates.

In ink jet technology, amino functionalized sol gel chemistry has been disclosed in US20040050293 to create water fastness in aqueous ink jet inks when printing on plain paper. A similar approach has been disclosed in EP940456, EP1010739 and EP856566 also targeting at water fastness on plain paper. An overcoat liquid comprising an silane coupling reagent has been disclosed in JP2004174834 to improve the physical properties of the printed image when used as an overprint varnish. All applications are typically targeted at small office-home office applications, having a low throughput, and not at industrial applications, requiring high throughput and requiring high printing speeds.

EP1362904A discloses water-based repellent for treatment of substrates comprising amino functionalized siloxane resins. However, these resins are very hydrophobic which is not compatible with aqueous inkjet printing liquids.

WO08138726A describes the polycondensation of 3-aminopropyl triethoxysilane to obtain silicone resin particles. The resin particles contain a chromophoric group which makes the resin particles colored. Colored resin particles have to be avoided in inkjet printing as the color of these particles would interfere with the color of the ink colorant.

The approaches, disclosed in the prior art all lead to polymeric structures having a large soluble fraction in aqueous liquids. It is known that soluble polymers negatively impact the jetting performance of aqueous ink jet inks when using jetting at high frequency for high throughput industrial applications. Therefore, it would be advantageous to design colloidal sol-gel based systems, far less impacting the rheological behaviour of ink jettable aqueous liquids, creating printing latitude.

SUMMARY OF INVENTION

It is an object of the present invention to provide an amine functionalized siloxane resin particle dispersion for ink jet printing as defined in Claim 1.

It is a further object of the present invention to provide a jettable aqueous liquid for inkjet printing comprising an amine functionalized siloxane resin particle according to Claim 5.

It is an even further object of the present invention to provide an aqueous jettable pre-treatment liquid comprising an amine functionalized siloxane resin particle according to Claim 6.

It is another object of the present invention to provide an aqueous jettable overprint varnish comprising an amine functionalized siloxane resin particle according to Claim 7.

It is another object of the present invention to provide an ink set, comprising at least one aqueous ink jet ink and at least one jettable aqueous liquid comprising an amine functionalized siloxane resin particle according Claim 8.

It is another object of the present invention to provide an image recording method of the ink set comprising at least one aqueous ink jet ink and at least one aqueous jettable liquid comprising an amine functionalized siloxane resin particle according Claim 11.

These and other objects will become apparent from the detailed description hereinafter.

DESCRIPTION OF EMBODIMENTS

A. Amine Functionalized Siloxane Resin Particle.

The objects of the present invention are realized by an amino functionalized siloxane resin particle, characterized in that said resin particle is obtainable by polycondensation of at least one cationic alkoxysilane surfactant according to general formula I and at least on amino functionalized alkoxysilane according to general formula II

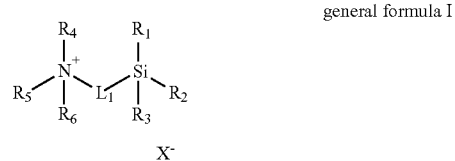

general formula I wherein:
$R_1$ to $R_3$ are independently selected from the group consisting of an alkoxy group, a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group, with the proviso that at least one of $R_1$ to $R_3$ represents an alkoxy group $R_4$ and $R_5$ are independently selected from a substituted or unsubstituted alkyl group, a substituted or unsubstituted alkenyl group, a substituted or unsubstituted alkynyl group, a substituted or unsubstituted alkaryl group, a substituted or unsubstituted aralkyl group, a substituted or unsubstituted aryl or heteroaryl group $R_6$ represents a group comprising a hydrocarbon group having at least eight carbon atoms Any of $R_4$ to $R_6$ may represent the necessary carbon atoms to form a five to eight membered ring $L_1$ represents a divalent linking group having no more than 10 carbon atoms and is selected from a substituted or unsubstituted alkylene group, a substituted or unsubstituted alkenylene group, a substituted or unsubstituted alkynylene group and a substituted or unsubstituted arylene group with the proviso that the divalent linking group may contain functional groups selected from an amide, an ester, an ether, a thioether or an ureum.

$X^-$ represents a counterion to compensate the positive charge of said cationic surfactant general formula II

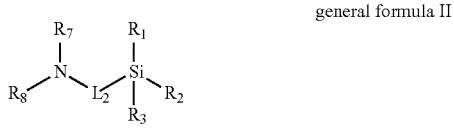

wherein $R_1$ to $R_3$ are defined as above $R_7$ and $R_8$ are independently selected from the group consisting of a hydrogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group $R_7$ and $R_8$ may represent the necessary atoms to form a five to eight membered ring $L_2$ represents a divalent linking group having no more than 10 carbon atoms In a preferred embodiment at least two of $R_1$ to $R_3$ represent an alkoxy group, most preferably $R_1$, $R_2$ and $R_3$ represent an alkoxy group, a $C_1$ to $C_6$ alkoxy group being more preferred, a methoxy, ethoxy, propoxy and isopropoxy group being even more preferred, a methoxy group and an ethoxy group being most preferred. When $R_1$, $R_2$ and $R_3$ all represent an alkoxy group, a crosslinked resin particle is obtained. The amount of monomers having $R_1$, $R_2$ and $R_3$ representing an alkoxy group is preferably at least 20 mol % or more, more preferably at least 40 mole % or more, most preferably 60 mole % of the total amount of the cationic alkoxysilane surfactant according to general formula I and the amino functionalized alkoxysilane according to general formula II.

In a further preferred embodiment, $R_4$ and $R_5$ are selected from the group consisting of a substituted or unsubstituted alkyl group, a substituted or unsubstituted alkaryl group, a substituted or unsubstituted aralkyl group and a substituted or unsubstituted aryl group, an unsubstituted alkyl group being more preferred, a $C_1$ to $C_6$ alkyl group being most preferred. $R_4$ and $R_5$ can be further functionalized with an alkoxysilane moiety.

In an even further preferred embodiment, $R_6$ represents a substituted or unsubstituted alkyl group, an unsubstituted alkyl group being more preferred. $R_6$ most preferably represents an unsubstituted alkyl group having at least ten carbon atoms, even more preferably at least twelve carbon atoms.

In another preferred embodiment, $R_7$ and $R_8$ are independently selected from the group consisting of a hydrogen and a substituted or unsubstituted alkyl group. In an even further preferred embodiment, at least one of $R_7$ and $R_8$ represent a hydrogen. In the most preferred embodiment, both $R_7$ and $R_8$ represent a hydrogen.

In a further preferred embodiment, $L_1$ and $L_2$ are independently selected from the group consisting of a substituted or unsubstituted alkylene group and a substituted or unsubstituted arylene group, a unsubstituted alkylene group and an unsubstituted arylene group being more preferred, a propylene group being the most preferred.

The amino functionalized resin particles according to the present invention are preferably prepared by emulsifying a mixture of the cationic alkoxysilane surfactant, according to the general formula I, and the amino functionalized alkoxysilane according to the general formula II in water. The alkoxysilanes hydrolyse at the interface and start polymerizing. Upon further hydrolysis and polymerization, the amino functionalized resin particle according to the present invention is formed. In a preferred embodiment, the formed alcohol during hydrolysis and polymerization is removed from the mixture by distillation.

A catalyst can be added during hydrolysis and polymerization but preferably the particle is formed without use of a catalyst.

A water immiscible solvent can be added if the viscosity of the mixture would be too high for emulsification or if one of the components would be insoluble in the mixture. After hydrolysis and polymerization, the water immiscible solvent can be removed by distillation.

Additional co-monomers can be added. Preferred monomers are alkoxysilanes. They can be selected from the group consisting of tetra-alkoxysilanes, tri-alkoxysilanes, di-alkoxysilanes and mono-alkoxysilanes, tetra- and tri-alkoxysilanes being more preferred, tri-alkoxysilanes being the most preferred. In a preferred embodiment, said co-monomer is added in an amount of less than 50 wt. % of the total monomer composition of said amino functionalized resin particle, more preferably less than 30 wt. % and most preferably less than 20 wt. %.

The cationic alkoxysilane surfactant according to the present invention are preferably added in an amount of less than 25 wt. % of the total monomer content, more preferably less than 15 wt. % and most preferably between 0.5 and 7 wt % of the total monomer content.

Typical cationic alkoxysilane surfactants according to the present invention are given in Table 1, without being limited thereto.

TABLE 1

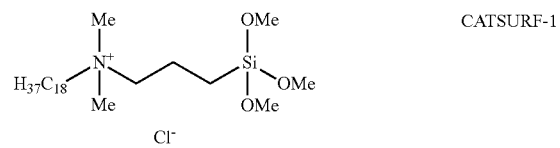

CATSURF-1

TABLE 1-continued

| Structure | Name |
|---|---|
| (C₁₀H₂₁)(H₂₁C₁₀)(Me)N⁺—CH₂CH₂CH₂—Si(OMe)₃  Cl⁻ | CATSURF-2 |
| (Me)(H₂₉C₁₄)(Me)N⁺—CH₂CH₂CH₂—Si(OMe)₃  Cl⁻ | CATSURF-3 |
| (MeO)₃Si—CH₂CH₂CH₂—N⁺(H₂₁C₁₀)(Me)—CH₂CH₂CH₂—Si(OMe)₃  Cl⁻ | CATSURF-4 |
| (Me)(H₂₅C₁₂)(Me)N⁺—CH₂CH₂CH₂—Si(OEt)₃  TsO⁻ | CATSURF-5 |
| H₁₉C₉—C(=O)—O—CH₂CH₂—N⁺(Et)(Et)—CH₂CH₂CH₂—Si(OEt)₃  TsO⁻ | CATSURF-6 |
| H₂₁C₁₀—O—CH₂CH₂—O—CH₂CH₂—N⁺(Et)(Et)—CH₂CH₂CH₂—Si(OEt)₃  TsO⁻ | CATSURF-7 |

Typical amino functionalized alkoxysilanes according to the present invention are given in Table 2, without being limited thereto.

TABLE 2

| Structure | Name |
|---|---|
| H₂N—CH₂CH₂CH₂—Si(OEt)₃ | AMINOSIL-1 |
| H₂N—(CH₂)₆—NH—CH₂CH₂CH₂—Si(OEt)₃ | AMINOSIL-2 |
| H₂N—CH₂CH₂—NH—CH₂CH₂CH₂—Si(OEt)₃ | AMINOSIL-3 |

TABLE 2-continued

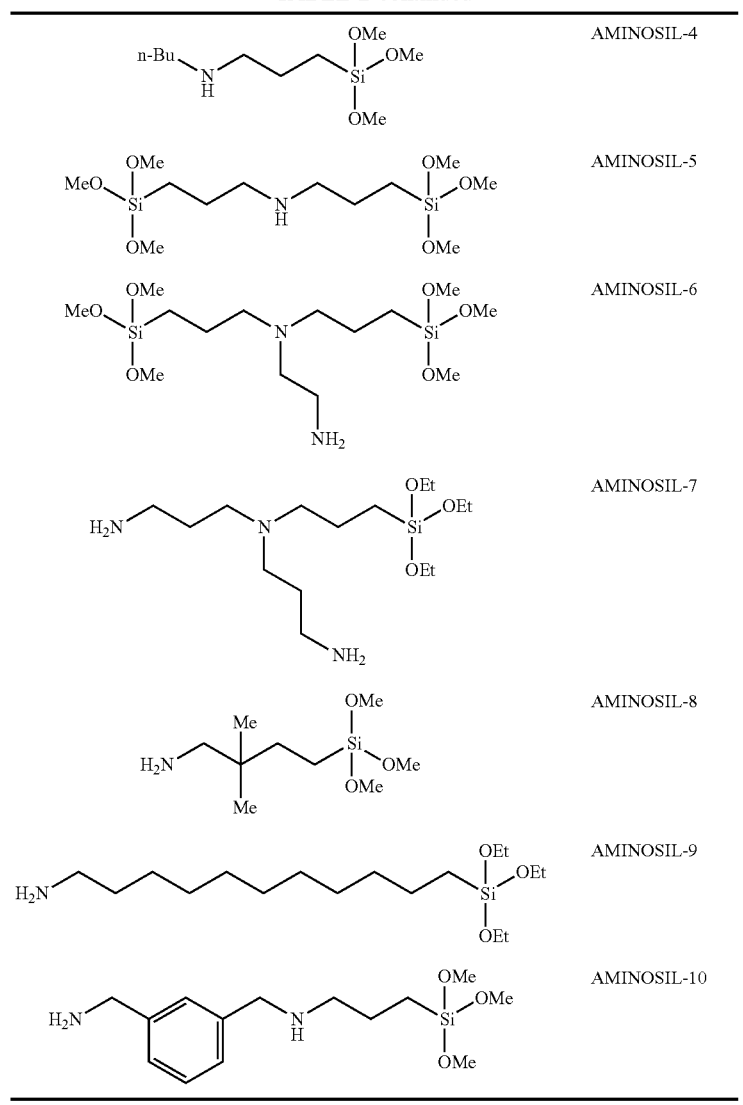

B. Aqueous Dispersion of the Cationic Polymer Nanoparticle

An aqueous dispersion of the amino functionalized resin particles according to the present invention is preferably prepared by emulsifying a mixture of the cationic alkoxysilane surfactant, according to the general formula I, and the amino functionalized alkoxysilane according to the general formula II in water. The alkoxysilanes hydrolyse at the interface and start polymerizing. Upon further hydrolysis and polymerization, the dispersion of the amino functionalized resin particle according to the present invention is formed. In a preferred embodiment, the formed alcohol during hydrolysis and polymerization is removed from the mixture by distillation.

C. Jettable Aqueous Liquid for Inkjet Printing

The aqueous dispersion of the amino functionalized resin particles according to the present invention can be used in jettable aqueous liquids for inkjet printing such as a pre-treatment liquid or an over-print varnish.

The obtained aqueous liquid according to the present invention may contain the amino functionalized siloxane resin particles according to the present invention in an amount of 1 wt. % to 30 wt. %, more preferably in an amount of 5 wt. % to 25 wt. % and most preferably in an amount of 10 wt. % to 20 wt. % with respect to the total weight of the aqueous liquid. The average particle diameter of the amino functionalized siloxane resin particles according to the present invention may be from about 10 nm to about 1 μm. Preferably, the average particle diameter may be from about 10 nm to about 500 nm. More preferably, the average particle diameter may be from about 50 nm to about 250 nm. To avoid jetting reliability problems, the average particle diameter of the amino functionalized siloxane resin particles should be below 1 μm.

The aqueous liquid can be applied onto the substrate or onto the printed images by means of a coating technique, a spraying technique or a jetting technique. Preferable jetting techniques are inkjet and valve jet. The aqueous liquid becomes then a jettable aqueous liquid.

C.1. Water Soluble Organic Solvent

The jettable aqueous liquid, comprising the amino functionalized resin particles according to the present invention may contain, besides water as a solvent, also a water-soluble organic solvent. Examples of water-soluble organic solvents include polyhydric alcohols such as diethylene glycol, triethylene glycol, dipropylene glycol, 1,3-propanediol, 1,3-butanediol, 1,4-butanediol, 2,2-dimethyl-1,3-propanediol, 2-methyl-1,3-propanediol, 1,2-pentanediol, 2,4-pentanediol, 1,5-pentanediol, 1,6-hexanediol, 2-ethyl-1,3-hexanediol, 1,2-hexanediol and 2,5-hexanediol, polyhydric alcohol alkyl ethers such as dipropylene glycol n-propyl ether, tripropylene glycol methyl ether, tripropylene glycol n-propyl ether, propylene glycol phenyl ether, triethylene glycol methyl ether, triethylene glycol methyl ether, triethylene glycol ethyl ether, diethylene glycol n-hexyl ether and ethylene glycol phenyl ether, and nitrogen-containing heterocyclic compounds such as 2-pyrrolidone and N-methylpyrrolidone.

Other preferred water soluble organic solvents include ethylene glycol, propylene glycol, 1,2-butanediol, 2,3-butanediol, 2-methyl-2, 4-pentanediol, dipropylene glycol monomethyl ether, propylene glycol n-butyl ether, propylene glycol t-butyl ether, diethylene glycol methyl ether, ethylene glycol n-propyl ether and ethylene glycol n-butyl ether.

The content of the water-soluble organic solvent, in the aqueous liquid is preferably less than 70 wt. %. If the content exceeds 70% by mass, the liquid loses its water based, hence more green character. The amount of water-soluble organic solvent is preferably between 1 and 40 wt. %, more preferably between 5 and 40 wt. %.

The water-soluble organic solvent is added to the jettable aqueous liquid comprising the amino functionalized resin particles according to the present invention to prevent fast drying of the liquid at the nozzles of the inkjet head avoiding jetting failure and further helps in dissolving additional compounds in the liquid.

C.2. Surfactant

In the jettable aqueous liquid of the present invention, a surfactant may be added in order to ensure wettability onto the substrate, if used as a primer or onto the printed images if used as an over-print varnish. The amount of the surfactant added is preferably 0.1 wt. % to 5 wt. % as an active component in the liquid.

If the amount added is below 0.1% by mass, wettability onto the substrate or printed images is not sufficient and causes degradation in image quality and in adhesion to the substrate. The surfactant that can be used is not particularly limited as long as it satisfies the above limitation.

The surfactant is preferably an amphoteric surfactant, a non-ionic or cationic surfactant because interaction with the cationic resin particles are reduced with respect to an anionic surfactant. Examples of non-ionic surfactants are polyoxyethylene alkyl phenyl ether, polyoxyethylene alkyl ester, polyoxyethylene alkylamine, polyoxyethylene alkyl amide, a polyoxyethylene propylene block polymer, sorbitan fatty acid ester, polyoxyethylene sorbitan fatty acid ester and an ethylene oxide adduct of acetylene alcohol are preferably used in terms of a relationship between dispersing stability and image quality. In addition, a fluorine-based surfactant and a silicon-based surfactant can be used in combination (or singly) depending on formulation.

Suitable non-ionic surfactants are preferably a glycol surfactant and/or an acetylene alcohol surfactant. The use of the acetylene glycol surfactant and/or the acetylene alcohol surfactant further reduces bleeding to improve printing quality, and also improves the drying property in printing to allow high-speed printing.

The acetylene glycol surfactant and/or the acetylene alcohol surfactant is preferably one or more selected from 2,4,7,9-tetramethyl-5-decine-4,7-diol, alkylene oxide adducts of 2,4,7,9-tetramethyl-5-decine-4,7-diol, 2,4-dimethyl-5-decin-4-ol, and alkylene oxide adducts of 2,4-dimethyl-5-decin-4-ol. These are available, for example, from Air Products (GB) as Olfine (registered trademark) 104 series and E series, such as Olfine E1010, or from Nissin Chemical Industry as Surfynol (registered trademark) 465 and Surfynol 61.

Other suitable surfactants are siloxane based surfactants such as Tego Twin 4000 from Evonik Industries, Tegowet 270 from Evonik industries, Hydropalat WE3220 from BASF, silane based surfactants such as Silwet HS312 from Momentive and fluor containing surfactants such as: Thetawet FS8150 from Neochem GMBH, Capstone FS3100 from Dupont, Tivida FL2500 from Merck and surfactants from the Dynol, Envirogem & Surfynol series from Air products.

Examples of cationic surfactants include tetraalkylammonium salts, alkylamine salts, benzalkonium salts, alkylpyridium salts and imidazolium salts, such as dihydoxyethylstearylamine, 2-heptadecenylhydroxyethylimidazoline, lauryldimethylbenzylammonium chloride, cetylpyridinium chloride and stearamidemethylpyridium chloride.

C.3. Additives

Together with the amino functionalized siloxane resin particles according to the present invention, a multivalent metal ion or cationic polymer can be contained in the aqueous liquid, especially when the liquid is a pre-treatment liquid or fixer liquid and is coated or printed onto a substrate prior to the jetting of the colored aqueous inkjet ink. The multivalent metal ion or cationic polymer is able to cause aggregation of the colorants in the aqueous inkjet ink when jetted onto the primer. These polyvalent metal ions or cationic polymers have a function of aggregating ink by acting on anionic groups such as the carboxyl groups on the surface of the pigment or the dispersed polymer contained in the ink. As a result, the ink remains immobilized on the surface of the substrate to improve the colour-developing property. Therefore, it is preferred that the surface of the pigment in the ink and/or the dispersed polymer of the resin particles such as capsules contained in the ink have an anionic group selected from the group of carboxyl group, sulfonate group and phosphonate group, most preferably carboxyl group.

Suitable examples of water-soluble metal salts are formed from bi- or higher valent metal cations, such as magnesium, calcium, strontium, barium, zirconium, and aluminum, and anions, such as a fluoride ion ($F^-$), a chloride ion ($Cl^-$), a bromide ion ($Br^-$), a sulfate ion ($SO_4^{2-}$), a nitrate ion ($NO_3^-$), and an acetate ion ($CH_3COO^-$).

Suitable examples of cationic polymers include polyamines, quaternized polyamines and polyguanidines. Other cationic polymers include poly(N, N, -dimethyl-2-hydroxypropylene ammonium chloride), poly(4-vinyl-1-methyl-pyridinium bromide), polydiallydimethylammoniumchloride, copolymers of quaternized vinylimidazole and polyquaternium. Examples of polyamines that can be preferably employed in the primer of the invention of this include polyethyleneimine, polyvinylpyridine, polyvinylamine, polyallylamine, and combinations thereof.

The jettable aqueous liquid may also contain colorants, such as pigments. Particularly useful for printing on colored substrates such as dark textile, brown corrugated cardboard or colored leather is a jettable aqueous liquid acting as a pre-treatment liquid and containing a white pigment. The preferred pigment for the aqueous pre-treatment liquid is titanium dioxide. Titanium dioxide ($TIO_2$) pigment useful in the present invention may be in the rutile or anatase crystalline form. Processes for making $TiO_2$ are described in greater detail in "The Pigment Handbook", Vol. I, 2nd Ed., John Wiley & Sons, NY (1988), the relevant disclosure of which is incorporated by reference herein for all purposes as if fully setforth.

The titanium dioxide particles can have a wide variety of average particle sizes of about 1 micron or less, depending on the desired end use application of the treatment liquid. For applications demanding high hiding or decorative printing applications, the titanium dioxide particles preferably have an average size of less than about 1 μm. Preferably, the particles have an average size of from about 50 to about 950 nm, more preferably from about 75 to about 750 nm, and still more preferably from about 100 to about 500 nm.

In addition, unique advantages may be realized with multiple particle sizes, such as opaqueness and UV protection. These multiple sizes can be achieved by adding both a pigmentary and a nano grade of $TIO_2$.

The titanium dioxide pigment may also bear one or more metal oxide surface coatings. These coatings may be applied using techniques known by those skilled in the art. Examples of metal oxide coatings include silica, alumina, alumina-silica, boria and zirconia, among others. These coatings can provide improved properties including reducing the photo-reactivity of the titanium dioxide. Metal oxide coatings of alumina, aluminasilica, boria and zirconia result in a positive charged surface of the $TiO_2$ pigments and hence are particularly useful in combination with the amino functionalized siloxane resin particles of the invention because no additional surface treatment of the pigment is required.

Commercial examples of such coated titanium dioxides include R700 (alumina-coated, available from E.I. DuPont deNemours, Wilmington Del.), RDI-S (alumina-coated, available from Kemira Industrial Chemicals, Helsinki, Finland), R706 (available from DuPont, Wilmington Del.) and W-6042 (a silica alumina treated nano grade titanium dioxide from Tayco Corporation, Osaka Japan). Other suitable white pigments are given by Table 2 in [0116] of WO 2008/074548. The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548.

If the jettable aqueous liquid is an over-print varnish or post-treatment liquid which is applied onto the printed image, the liquid may include a resin, preferably a latex. The latex may be present in the liquid of at least 5 weight percent to about 30 wt. % and further increases the resistance of the printed image against mechanical impact (abrasion, scratching) and chemical attack by means of organic solvents or water. In one example, the latex may be selected from a group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers, acrylonitrile-butadiene polymers or copolymers, polyurethanes and mixtures thereof. Preferably, the latex has a cationic charge in order to be compatible with the amino functionalized siloxane resin particles of the invention.

The liquid may also contain humectants. Humectants are preferably incorporated if the aqueous jettable liquid has to be applied by means of a jetting technique such as inkjet or valve jet. Humectants prevent the clogging of nozzles. The prevention is due to its ability to slow down the evaporation rate of the jettable aqueous liquid, especially the water in the liquid. The humectant is preferably an organic solvent having a higher boiling point than water. Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. A preferred humectant is glycerol.

The humectant is preferably added to the liquid formulation in an amount of 0.1 to 20 wt. % based on the total weight of the liquid.

D. Ink Set

It is also an object of the present invention to provide an ink set, comprising at least one aqueous ink jet ink and at least one jettable aqueous liquid as described in § C.

The aqueous inkjet ink preferably comprises a water-soluble organic solvent and a colorant.

D.1. Water-Soluble Organic Solvent

The aqueous medium of the inkjet ink making part of the ink set according to the invention contains water, but may preferably include one or more water-soluble organic solvents. These solvents are added to prevent the fast drying of the aqueous inkjet ink at the nozzle of the inkjet head, help dissolving certain compound in the aqueous inkjet ink and help penetration of the ink in porous substrates. Suitable solvents which can be incorporated in the inks are preferably polyols (e.g., ethylene glycol, glycerin, 2-ethyl-2-(hydroxymethyl)-1,3-propanediol, tetraethylene glycol, triethylene glycol, tripropylene glycol, 1,2,4-butanetriol, diethylene glycol, propylene glycol, dipropylene glycol, butyleneglycol, 1,6-hexanediol, 1,2-hexanediol, 1,5-pentanediol, 1,2-pentanediol, 2,2-dimethyl-1,3-prapanediol, 2-methyl-2,4-pentanediol, 3-methyl-1,5-pentanediol, 3-methyl-1,3-butanediol, and 2-methyl-1,3-propanediol), amines (e.g., ethanolamine, and 2-(dimethylamino)ethanol), monohydric alcohols (e.g., methanol, ethanol, and butanol), alkyl ethers of polyhydric alcohols (e.g., diethylene glycol monomethyl ether, diethylene glycol monobutyl ether, triethylene glycol monomethyl ether, triethylene glycol monobutyl ether, ethylene glycol monomethyl ether, ethylene glycol monobutyl ether, propylene glycol monomethyl ether, propylene glycol monobutyl ether, and dipropylene glycol monomethyl ether), 2,2'thiodiethanol, amides (e.g., N,N-dimethylformamide), heterocycles (e.g., 2-pyrrolidone and N-methyl-2-pyrrolidone), and acetonitrile.

D.2. Colorant

The aqueous ink making part of the ink set according to the invention comprises a colorant. The colorant may be a water-soluble dye, a disperse dye, a pigment. Preferably the colorant is a pigment which can be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley—VCH, 2004. ISBN 3527305769.

Suitable pigments are disclosed in paragraphs [0128] to [0138] of WO 2008/074548.

The pigment particles are dispersed in an aqueous medium by means of a polymeric dispersant or a surfactant. Self-dispersible pigments may also be used. If combined with capsules having anionic dispersing groups, anionic surfactants may be preferably used as dispersant for the pigment. The latter prevents interaction of the polymeric dispersant with the dispersing groups of the resin particles or capsules which may be included in the inkjet ink, since dispersion stability of the pigment is accomplished by the same technique of electrostatic stabilization as employed for the resin particles or capsules.

A self-dispersible pigment is a pigment having on its surface covalently bonded anionic hydrophilic groups, such as salt-forming groups or the same groups used as dispersing groups for the capsules, that allow the pigment to be dispersed in an aqueous medium without using a surfactant or a resin. Suitable commercially available self-dispersible colour pigments are, for example, the CAB-O-JET™ inkjet colorants from CABOT.

Pigment particles in inkjet inks should be sufficiently small to permit free flow of the ink through the inkjet-printing device, especially at the ejecting nozzles. It is also desirable to use small particles for maximum colour strength and to slow down sedimentation.

The average pigment particle size is preferably between 0.050 and 1 μm, more preferably between 0.070 and 0.300 μm and particularly preferably between 0.080 and 0.200 μm. Most preferably, the numeric average pigment particle size is no larger than 0.150 μm. The average particle size of pigment particles is determined with a Brookhaven Instruments Particle Sizer B190plus based upon the principle of dynamic light scattering. The ink is diluted with water to a pigment concentration of 0.002 wt %. The measurement settings of the B190plus are: 5 runs at 23° C., angle of 90°, wavelength of 635 nm and graphics=correction function.

However, for white pigment inkjet inks, the numeric average particle diameter of the white pigment is the same as described in § C.3.

Suitable white pigments are given by Table 2 in [0116] of WO 2008/074548. The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548.

Also special colorants may be used, such as fluorescent pigments for special effects in clothing, and metallic pigments for printing a luxury look of silver and gold colours on textiles.

Suitable polymeric dispersants for the pigments are copolymers of two monomers but they may contain three, four, five or even more monomers. The properties of polymeric dispersants depend on both the nature of the monomers and their distribution in the polymer. Co-polymeric dispersants preferably have the following polymer compositions:
- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

Suitable dispersants are DISPERBYK™ dispersants available from BYK CHEMIE, JONCRYL™ dispersants available from JOHNSON POLYMERS and SOL-SPERSE™ dispersants available from Lubrisol. A detailed list of non-polymeric as well as some polymeric dispersants is disclosed by MC CUTCHEON. Functional Materials, North American Edition. Glen Rock, N.J.: Manufacturing Confectioner Publishing Co., 1990. p. 110-129.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The pigments are preferably present in the range of 0.01 to 20%, more preferably in the range of 0.05 to 10% by weight and most preferably in the range of 0.1 to 5% by weight, each based on the total weight of the inkjet ink. For white inkjet inks, the white pigment is preferably present in an amount of 3% to 40% by weight of the inkjet ink, and more preferably 5% to 35%. An amount of less than 3% by weight cannot achieve sufficient covering power.

D.3. Resin

The aqueous ink jet ink making part of the ink set according to the present invention preferably comprises a resin. Without being bound to any theory, it is thought that the amino functionalized siloxane resin particle may also react with a resin present in the aqueous inkjet ink upon contact between the liquid comprising the amino functionalized siloxane resin particle and the aqueous inkjet ink. This extra reaction creates a network and further improves mechanical and chemical resistance of the formed image.

The resin may be present in the ink as a polymeric dispersant (see § D.2.) for the pigment or as a binder to achieve a good adhesion of the pigment to the substrate. The binder can be a polymeric particle or a resin such as an acrylic based resin, a urethane-modified polyester resin or a polyethylene wax.

The aqueous inkjet ink of the fluid set according to the invention, preferably comprises a capsule comprising a polymeric shell surrounding a core, the core comprises an oligomer or polymer having at least 3 repeating units comprising a functional group according to general formula III, IV or V

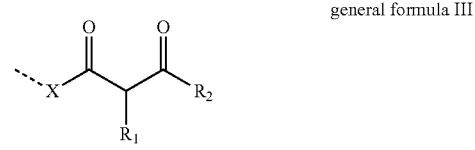

general formula III

general formula IV

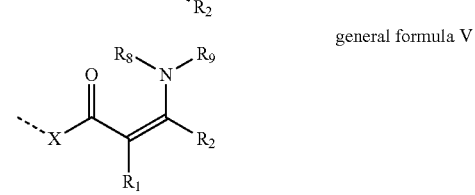

general formula V wherein
$R_1$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, $COR_3$ and CN $R_2$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group and $COR_3$ $R_1$ and $R_2$ may represent the necessary atoms to form a five to eight membered ring $R_3$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, $OR_4$ and $NR_5R_6$ $R_4$ is selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group $R_5$ and $R_6$ are independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group $R_5$ and $R_6$ may represent the necessary atoms to form a five to eight membered ring X is selected from the group consisting of O and $NR_7$ $R_7$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group.

$R_8$ and $R_9$ are independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group $R_8$ and $R_9$ may represent the necessary atoms to form a five to eight membered ring.

In a preferred embodiment said oligomer or polymer comprising repeating units functionalized with a moiety according to general formula III, comprise at least 7 functionalized, more preferably at least 10 and most preferably at least 15 functionalized repeating units.

The oligomer or polymer having at least 3 repeating units comprising a functional group according to general formula III, IV or V preferably has a weight average molecular weight of at least 2000, more preferably 4000 and most preferably between 6000 and 30000.

The oligomer or polymer having at least 3 repeating units comprising a functional group according to general formula III, IV or V can be prepared by addition polymerization of ethylenically unsaturated monomers, polycondensation and ring opening polymerization, addition polymerization being particularly preferred. In the most preferred embodiment, free radical polymerization of ethylenically unsaturated monomers is used to prepare the resins according to the present invention In a further preferred embodiment, X represents an oxygen. In an even further preferred embodiment, $R_1$ represents a hydrogen. In an even further preferred embodiment $R_2$ represent a substituted or unsubstituted alkyl group, unsubstituted being more preferred, a lower alkyl group being even more preferred and a methyl group being the most preferred.

In a more preferred embodiment, the capsules comprising an oligomer or polymer having at least 3 repeating units comprising a functional group according to general formula III, IV or V are dispersed in the aqueous medium of the inkjet ink using a dispersing group covalently bonded to the polymeric shell or are dispersed by using dispersants or surfactants preferably added during or after he formation of the capsule. The dispersing group covalently bonded to the polymeric shell is preferably selected from the group consisting of a carboxylic acid or salt thereof, a sulfonic acid or salt thereof, a phosphoric acid ester or salt thereof, a phosphonic acid or salt thereof, an ammonium group, a sulfonium group, a phosphonium group and a polyethylene oxide group.

There is no real limitation on the type of polymer used for the polymeric shell of the capsule. Preferably, the polymer used in the polymeric shell is cross-linked. By crosslinking, more rigidity is built into the capsules allowing a broader range of temperatures and pressures for handling the capsules in both the ink making and in the inkjet printer.

Preferred examples of the polymeric shell material include polyureas, polyesters, polycarbonates, polyamides, melamine based polymers and mixtures thereof, with polyureas being especially preferred.

Typical monomers for the preparation of the oligomer or polymer having at least 3 repeating units comprising a functional group according to general formula III, IV or V are given in Table 1, 2 and 3 of the unpublished patent application EP19217051.2. The encapsulation of the oligomer or polymer can be done as described in § A.2. and A.3. of the unpublished patent application EP19217051.2.

Polyurethane resins may also be incorporated in the ink formulation as a dispersion and may be selected from the group consisting of aliphatic polyurethane dispersions, aromatic polyurethane dispersions, anionic polyurethane dispersions, non-ionic polyurethane dispersions, aliphatic polyester polyurethane dispersions, aliphatic polycarbonate polyurethane dispersions, aliphatic acrylic modified polyurethane dispersions, aromatic polyester polyurethane dispersions, aromatic polycarbonate polyurethane dispersions, aromatic acrylic modified polyurethane dispersions, for example, or a combination of two or more of the above.

A preferred urethane resin to be used as dispersion in the ink of the invention is a polyester resin including a structural unit containing a urethane bond. Among such resins, a water-soluble or water-dispersible urethane-modified polyester resin is preferred. It is preferable that the urethane-modified polyester resin include at least one structural unit derived from a hydroxyl group-containing polyester resin (polyester polyol) and at least one structural unit derived from an organic polyisocyanate.

Furthermore, the hydroxyl group-containing polyester resin is a resin formed by an esterification reaction or transesterification reaction between at least one polybasic acid component and at least one polyhydric alcohol component.

A preferred polyurethane resin which may be included in the ink of the invention is a polyurethane resin obtainable by reacting a polyester polyol, a polyether diol, a polyol containing an anionic group and a polyisocyanate. A particular preferred polyurethane resin is a polyurethane resin obtainable by reacting a polyester polyol, a polyether diol, a polyol containing an anionic group and a polyisocyanate, and wherein the polyester polyol is obtained by reacting an aromatic polycarboxylic acid and a polyol. Examples of suitable polyurethane resins and their preparations are disclosed in the published patent application WO2018/077624.

Some examples of suitable polyurethane dispersions are NEOREZ R-989, NEOREZ R-2005, and NEOREZ R-4000 (DSM NeoResins); BAYHYDROL UH 2606, BAYHYDROL UH XP 2719, BAYHYDROL UH XP 2648, and BAYHYDROL UA XP 2631 (Bayer Material Science); DAOTAN VTW 1262/35WA, DAOTAN VTW 1265/36WA, DAOTAN VTW 1267/36WA, DAOTAN VTW 6421/42WA, DAOTAN VTW 6462/36WA (Cytec Engineered Materials Inc., Anaheim CA); and SANCURE 2715, SANCURE 20041, SANCURE 2725 (Lubrizol Corporation), for example, or a combination of two or more of the above.

Acrylic based resins include polymers of acrylic monomers, polymers of methacrylic monomers, and copolymers of the aforementioned monomers with other monomers. These resins are present as a suspension of particles having an average diameter of about 30 nm to about 300 nm. The acrylic latex polymer is formed from acrylic monomers or methacrylic monomer residues. Examples of monomers of the acrylic latex polymer include, by way of illustration, acrylic monomers, such as, for example, acrylate esters, acrylamides, and acrylic acids, and methacrylic monomers, such as, for example, methacrylate esters, methacrylamides, and methacrylic acids. The acrylic latex polymer may be a homopolymer or copolymer of an acrylic monomer and another monomer such as, for example, a vinyl aromatic monomer including, but not limited to, styrene, styrene butadiene, p-chloromethylstyrene, divinyl benzene, vinyl naphthalene and divinylnaphthalene.

Some examples of suitable acrylic latex polymer suspensions are, JONCRYL 537 and JONCRYL 538 (BASF Corporation, Port Arthur TX); CARBOSET GA-2111, CARBOSET CR-728, CARBOSET CR-785, CARBOSET CR-761, CARBOSET CR-763, CARBOSET CR-765, CARBOSET CR-715, and CARBOSET GA-4028 (Lubrizol Corporation); NEOCRYL A-1110, NEOCRYL A-1131, NEOCRYL A-2091, NEOCRYL A-1127, NEOCRYL XK-96, and NEOCRYL XK-14 (DSM); and BAYHYDROL AH XP 2754, BAYHYDROL AH XP 2741, BAYHYDROL A 2427, and BAYHYDROL A2651 (Bayer), for example, or a combination of two or more of the above.

The concentration of the resin in the ink jet ink making part of the ink set according to the invention is at least 1 wt. % and preferably lower than 30 wt. %, more preferably lower than 20 wt. % with respect to the total weight of the ink.

D.4. Additives

The aqueous inkjet ink making part of the ink set according to the invention may further comprise a surfactant, a humectant and a thickener as an additive. These suitable additives are described in § C.

E. Method of Image Recording

An embodiment of the inkjet image recording method according to the invention is the use of the ink set according to the invention. The ink set comprises a jettable aqueous liquid comprising the amino functionalized siloxane resin particle according to the invention and an aqueous inkjet ink comprising a colorant and a water-soluble organic solvent. Preferably the aqueous inkjet ink comprises a resin. The method comprises the steps of: a) applying on a substrate, the ink set of the present invention to form an image, preferably by a jetting technique; and b) drying the applied ink set by applying heat such that the temperature of the formed image is of at least 60° C., more preferably at least 80° C.

In another embodiment of the inkjet recording method of the invention using the ink set of the invention, the method comprises following steps: a) applying the aqueous liquid comprising the amino functionalized siloxane resin particle according to the present invention onto a substrate. The application is preferably done by a jetting technique such as inkjet, valve jet or spraying and; b) optionally at least partially dry the applied aqueous liquid and; c) jetting the aqueous inkjet ink from the ink set, the ink comprises a colorant, to form an image, onto the applied aqueous liquid. More preferably, the ink comprises a resin and; d) drying the jetted inkjet ink by applying heat such that the temperature of the formed image is of at least 60° C., more preferably at least 80° C.

In another embodiment of the inkjet recording method using the ink set according to the invention, the method comprises the steps of: a) jetting an aqueous inkjet ink on a substrate to form an image, the ink comprising a colorant and a water soluble organic solvent. Preferably the ink comprises a resin. The substrate may have been treated with a fixer or primer liquid comprising a component capable of aggregating components in an aqueous inkjet ink such as a flocculant or cationic compound. The substrate may be treated with the aqueous liquid comprising the amino functionalized siloxane resin particle of the invention; and b) optionally at least partially dry the jetted aqueous inkjet ink and; c) applying the aqueous liquid comprising the amino functionalized siloxane resin particle of the present invention. The application of the aqueous liquid comprising the amino functionalized siloxane resin particle is preferably done by a jetting technique such as inkjet, valve jet or spraying and; d) drying the applied ink set by applying heat such that the temperature of the formed image is of at least 60° C., more preferably at least 80° C.

The substrate in the inkjet recording method may be porous, such as e.g. textile, paper, leather and card board substrates, but is also suitable for image formation on non-absorbing substrates such as polyethylene, polypropylene, polycarbonate, polyvinyl chloride, polyesters like polyethylene terephthalate (PET), polyethylene naphthalate (PEN), polylactide (PLA) or polyimide.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of 1.10 g/cm$^3$ or more.

The aqueous liquid comprising the amino functionalized siloxane resin particle is preferably applied via a technique selected from the group of ink jetting, valve jetting and spraying. More specifically, these techniques of ink jetting and valve jetting allow, the aqueous liquid according to the invention to be applied image wise, preferably onto the surfaces of the substrate whereupon the inkjet ink will be printed to obtain an image. This process is also called under-printing. This has the advantages that the amount of required aqueous liquid is substantially lower than with other application methods of priming the substrate. This is because less aqueous liquid has to be dried and that the layer of dried primer may be less robust against interaction with chemicals and mechanical impact than the layer obtained by applying the inkjet ink.

Examples of the heating process to dry the applied ink set according to the invention include, but are not limited to, heat press, atmospheric steaming, high-pressure steaming, THERMOFIX. Any heat source can be used for the heating process; for example, an infrared ray source is employed.

The drying step can be performed at the air, but the heating step must be performed by using heat sources. More specifically, examples of heat sources include equipment for forced-air heating, radiation heating such as IR-radiation, including NIR- and CIR radiation, conduction heating, high-frequency drying, and microwave drying. The drying step is such that a temperature is preferably obtained below 150° C., more preferably below 100° C.

A preferred ink jet head for the inkjet printing system to jet the ink set of the invention is a piezoelectric ink jet head. Piezoelectric inkjet jetting is based on the movement of a piezoelectric ceramic transducer when a voltage is applied thereto. The application of a voltage changes the shape of the piezoelectric ceramic transducer in the print head creating a void, which is then filled with ink or liquid. When the voltage is again removed, the ceramic expands to its original shape, ejecting a drop of ink from the ink jet head. However, the jetting of the jettable aqueous liquid or ink set according to the present invention is not restricted to piezoelectric inkjet printing. Other inkjet print heads can be used and include various types, such as a continuous type, a thermal print head type, a MEM-jet type head and a valve jet type.

EXAMPLES

1. Measuring Methods 1.1 Inkjet Recording Method

The inkjet recording equipment for performing the inkjet recording method according to the invention was a Dimatix™ DMP2831 system, equipped with a standard Dimatix™ 10 pl print head. The ink was jetted at 22° C., using a firing frequency of 5 kHz, a firing voltage of 25 V and a standard waveform.

1.2. Solvent Resistance and Water Resistance

The solvent resistance of formed images and coatings is tested by wiping 40 times with a Q-tip over the coatings or printed images using isopropanol and methyl ethyl ketone as solvent or water.

A score of 0 means complete dissolution of the coating or image layer. A score of 1 means visible damage upon wiping. A score of 2 means no or hardly noticeable damage on the coating or image.

2. Materials

Desmodur N75 BA is a trifunctional isocyanate supplied by Bayer AG.

Lakeland ACP70 is a zwitterionic surfactant supplied by Lakeland Laboratories LTD.

Magenta-1 is Cab-o-Jet 465M is a magenta pigment dispersion supplied by Cabot.

Magenta-2 is Magenta EXP IJM03, supplied by Diamond (Lubrizol)

Surfynol 104H is a surfactant supplied by Nissin Chemical Industry

Dowanol DPM is a mixture of dipropyleneglycol monomethyl ethers from Dow Chemicals SUB-1: poly(propylene) (Priplak), supplied by Antalis SUB-2: Barlo XT, a PMMA substrate from the Barlo Group PMMA SUB-3: is MD5-100PVC, supplied by Metamark SUB-4: is a PVC foil, Forex Classic supplied by Antalis INVCOLLOID-1 is an amino functionalized siloxane resin particle dispersion prepared as follows: A mixture of 5 g dimethyloctadecyl[3-(trimethoxysilyl)propyl] ammonium chloride and 30 g 3-aminopropyl-trimethoxysilane was added to 100 g water while stirring with an Ultra Turrax for 5 minutes at 18000 rpm. 50 ml water was added and the mixture was evaporated at 65° C. during two hours under reduced pressure to remove the methanol that is formed during the reaction. The mixture was further evaporated to obtain a 25 wt. % aqueous dispersion.

COMPPOL-1 is a linear amino functionalized polysiloxane and is prepared as follows: 35 g aminopropyl-methyl-dimethoxysilane was dissolved in 65 g water and the mixture was heated to 70° C. for 24 hours. The evaporated methanol was compensated with water up to 100 g of the polymer solution.

KETORES-1 is a beto-keto ester resin according to general formula III and is prepared as follows: 10 g of 2-(acetoacetoxy)ethyl methacrylate was dissolved in 30 ml of ethyl acetate. 0.472 g of dodecyl mercaptane was added and the mixture was purged with nitrogen. 134 mg of 2,2'-azobis[2-methylbutyronitrile] was added and the mixture was refluxed for 6 hours. The mixture was allowed to cool down to room temperature. The solution of the resin KETORES-1 in ethylacetate was directly used in the synthesis of CAP-1. The molecular weight of KETORES-1 was determined, using GPC relative to poly(styrene) standards. KETORES-1 had a numeric weight average molecular weight Mn of 10500 and a weight average molecular weight Mw of 15400.

KETORES-2 is a beta-keto ester resin according to general formula III and is prepared as follows: 8.66 g of 2-(acetoacetoxy)ethyl methacrylate and 1.344 g of methyl methacrylate were dissolved in 30 ml of ethyl acetate. 0.544 g of dodecyl mercaptane was added and the mixture was purged with nitrogen. 155.2 mg of 2,2'-azobis[2-methylbutyronitrile] was added and the mixture was refluxed for 3 hours. An additional 77 mg of 2,2'-azobis[2-methylbutyronitrile] was added and the mixture was refluxed for 16 hours. The mixture was allowed to cool down to room temperature. The solution of KETORES-2 in ethylacetate was directly used in the synthesis of CAP-2. The molecular weight of KETORES-2 was determined, using GPC relative to poly(styrene) standards. KETORES-2 had a numeric weight average molecular weight Mn of 7966 and a weight average molecular weight Mw of 12069.

KETORES-3 is a beta-keto ester resin according to general formula III and is prepared as follows: 6.8 g of 2-(acetoacetoxy)ethyl methacrylate and 3.2 g of methyl methacrylate were dissolved in 30 ml of ethyl acetate. 0.643 g of dodecyl mercaptane was added and the mixture was purged with nitrogen. 183 mg of 2,2'-azobis[2-methylbutyronitrile] was added and the mixture was refluxed for 3 hours. An additional 91.5 mg of 2,2'-azobis[2-methylbutyronitrile] was added and the mixture was refluxed for 16 hours. The mixture was allowed to cool down to room temperature. The solution of KETORES-3 in ethylacetate was directly used in the synthesis of CAP-3. The molecular weight of KETORES-3 was determined, using GPC relative to poly(styrene) standards. KETORES-3 had a numeric weight average molecular weight Mn of 6925 and a weight average molecular weight Mw of 9943.

KETORES-4 is a beta-keto ester resin according to general formula III and was prepared as follows: 4.16 g of 2-(acetoacetoxy)ethyl methacrylate and 5.84 g of methyl methacrylate were dissolved in 30 ml of ethyl acetate. 0.787 g of dodecyl mercaptane was added and the mixture was purged with nitrogen. 224 mg of 2,2'-azobis[2-methylbutyronitrile] was added and the mixture was refluxed for 3 hours. An additional 112 mg of 2,2'-azobis[2-methylbutyronitrile] was added and the mixture was refluxed for 16 hours. The mixture was allowed to cool down to room temperature. The solution of KETORES-4 in ethylacetate was directly used in the synthesis of CAP-4. The molecular weight of KETORES-4 was determined, using GPC relative to poly(styrene) standards. KETORES-4 had a numeric weight average molecular weight Mn of 5697 and a weight average molecular weight Mw of 7744.

CAP-1 is a capsule dispersion and was prepared as follows: 13.2 g of Desmodur N75 BA was added to 37 g of the above described solution of KETORES-1 in ethyl acetate. 1.2 g of Lakeland ACP 70 was added and the solution was stirred for an hour at room temperature. This solution was added to a solution of 3.36 g Lakeland ACP 70, 1.17 g lysine and 1.5 g triethanol amine in 44 g water, while stirring with an Ultra Turrax at a rotation speed 16000 rpm for 5 minutes. 52 g water was added and the solvent evaporated at 60° C. under reduced pressure, while gradually increasing the vacuum from 500 mbar to 120 mbar. The weight of the dispersion was adjusted to 88 g by evaporating water at 120 mbar. The dispersion was stirred for 16 hours at 65° C. The dispersion was allowed to cool down to room temperature and the dispersion was filtered over a 1.6 μm filter. The average particle size was measured using a Zetasizer™ Nano-S (Malvern Instruments, Goffin Meyvis). The average particle size was 183 nm.

CAP-2 is a capsule dispersion and was prepared as follows: 6.6 g of Desmodur N75 BA was added to 18.5 g of the above described solution of KETORES-2 in ethyl acetate. 0.6 g of Lakeland ACP 70 was added and the solution was stirred for an hour at room temperature. This solution was added to a solution of 1.68 g Lakeland ACP 70, 0.59 g lysine and 1.5 g triethanol amine in 22 g water, while stirring with an Ultra Turrax at a rotation speed 16000 rpm for 5 minutes. 22 g water was added and the solvent evaporated at 60° C. under reduced pressure, while gradually increasing the vacuum from 500 mbar to 120 mbar. The weight of the dispersion was adjusted to 44 g by evaporating water at 120 mbar. The dispersion was stirred for 16 hours at 65° C. The dispersion was allowed to cool down to room temperature and the dispersion was filtered over a 1.6 μm filter. The average particle size was measured using a Zetasizer™ Nano-S (Malvern Instruments, Goffin Meyvis). The average particle size was 367 nm.

CAP-3 is a capsule dispersion and was prepared as described for CAP-2 except that KETORES-3 was used instead of KETORES-2. The average particle size was measured using a Zetasizer™ Nano-S (Malvern Instruments, Goffin Meyvis). The average particle size was 269 nm.

CAP-4 is a capsule dispersion and was prepared as described for CAP-2 except that KETORES-4 was used instead of KETORES-2. The average particle size was measured using a Zetasizer™ Nano-S (Malvern Instruments, Goffin Meyvis). The average particle size was 333 nm.

Example 1

The following inks were prepared according Table 3. All weight percentages are based on the total weight of the ink jet ink.

TABLE 3

| Wt. % of | INK-1 | INK-2 | INK-3 | INK4 |
| --- | --- | --- | --- | --- |
| CAP-1 | 38 | — | — | — |
| CAP-2 | — | 38 | — | — |
| CAP-3 | — | — | 38 | — |
| CAP-4 | — | — | — | 38 |
| Magenta-1 | 22 | 22 | 22 | 22 |
| Surfynol 104H | 2 | 2 | 2 | 2 |
| Dowanol DPM | 19 | 19 | 19 | 19 |
| glycol | 19 | 19 | 19 | 19 |

The inventive overcoat INV-1 and comparative overcoat COMP-1 were prepared by mixing the components given in Table 4. All weight percentages are based on the total weight of the ink jet ink.

TABLE 4

| Wt. % of | INV-1 | COMP-1 |
| --- | --- | --- |
| INVCOLLOID-1 | 100 | — |
| COMPOL-1 | — | 33 |
| Surfynol 104H | — | 1 |
| Dowanol DPM | — | 16 |
| Glycol | — | 16 |
| water | — | 33 |

The inks INK-1 to INK-4 were coated on a set of substrates SUB-1 to SUB-4, using a 4 micron wired bar, and dried for 5 minutes at 80° C. in an oven. On top of this coating the inventive overcoat INV-1 and comparative overcoat COMP-1 were coated using a 10 micron wired bar, and dried for 15 minutes at 80°. The solvent resistance of the coatings was measured according to the method described in § 1.2.

The results are summarized in Table 5.

TABLE 5

|  | INV-1 | | | COMP-1 | | |
| --- | --- | --- | --- | --- | --- | --- |
|  | Water | IPA | MEK | Water | IPA | MEK |
| SUB-1 | | | | | | |
| INK-1 | 2 | 2 | 2 | 1 | 1 | 1 |
| INK-2 | 2 | 2 | 2 | 0 | 1 | 1 |
| INK-3 | 2 | 2 | 2 | 1 | 1 | 1 |
| INK-4 | 2 | 2 | 2 | 0 | 1 | 0 |
| SUB-2 | | | | | | |
| INK-1 | 2 | 2 | 2 | 0 | 2 | 1 |
| INK-2 | 2 | 2 | 2 | 0 | 2 | 0 |
| INK-3 | 2 | 2 | 2 | 0 | 1 | 1 |
| INK-4 | 2 | 2 | 2 | 0 | 1 | 0 |

TABLE 5-continued

|  | INV-1 | | | COMP-1 | | |
|---|---|---|---|---|---|---|
|  | Water | IPA | MEK | Water | IPA | MEK |
| SUB-3 | | | | | | |
| INK-1 | 2 | 2 | 1 | 1 | 1 | 0 |
| INK-2 | 2 | 2 | 1 | 0 | 1 | 0 |
| INK-3 | 2 | 2 | 1 | 0 | 1 | 1 |
| INK-4 | 1 | 2 | 1 | 0 | 1 | 1 |
| SUB-4 | | | | | | |
| INK-1 | 2 | 2 | 2 | 0 | 1 | 0 |
| INK-2 | 1 | 2 | 2 | 0 | 0 | 0 |
| INK-3 | 1 | 2 | 1 | 0 | 1 | 0 |
| INK-4 | 0 | 2 | 2 | 0 | 0 | 0 |

From Table 5, it becomes apparent that the amine functionalized siloxane resin particle according to the present outperform soluble polymers based on the same type of chemistry.

Example 2

This example illustrates that the amine functionalized siloxane resin particle according to the present invention gives excellent physical properties when combined with resin free inks.

INK-5 was prepared by mixing the components given in Table 6. All weight percentages are based on the total weight of the ink jet ink.

TABLE 6

| Wt. % of | INK-5 |
|---|---|
| Magenta-2 | 22 |
| Dowanol DPM | 19 |
| Glycol | 19 |
| Water | 40 |

The ink INK-5 was coated on SUB-1, using a 4 micron wired bar, and dried for 5 minutes at 80° C. On top of this coating the inventive overcoat INV-1 was coated using a 10 micron wired bar, and dried for 15 minutes at 80°. The solvent resistance of the coatings was measured according to the method described in § 1.2. The results are summarized in Table 7.

TABLE 7

|  | INK-5 | INK-5 + INV1 |
|---|---|---|
| water | 1 | 1 |
| IPA | 2 | 2 |
| MEK | 0 | 2 |

From Table 7, it becomes apparent that the amine functionalized siloxane resin particles significantly improve the solvent resistance of the image, especially against aggressive organic solvents.

Example 3

This example illustrates the jettability of the aqueous liquids comprising the amine functionalized siloxane resin particles according to the present invention.

Inventive ink INV-2 was prepared by mixing the components according to Table 8. All weight percentages are based on the total weight of the ink jet ink.

TABLE 8

| Wt. % of | INV-2 |
|---|---|
| AMINE-2 | 60 |
| Glycol | 20 |
| Dowanol DPM | 20 |

Inventive ink INK-1 was printed on a polyester cotton mixed fiber fabric without special coating from Premier Textiles, UK according to the method described in § 1.1. The ink layer was overprinted twice with INV-2, according to the method described in § 1.1. A reference sample was printed only with inventive ink INK-1. The samples were dried at 80° C. for 15 minutes.

After printing and drying of the solid areas on the fabric, the dry and wet crock fastness test is done according to ISO105-X12 with a Crockmeter SDL ATLAS M238AA. The coloration of the white rubbing cloth was given as ΔE according to the Cielab color space. The lower the ΔE values, the better the crock fastness. The results are summarized in Table 9.

TABLE 9

|  | Fluid set: INK-1 + INV-2 | INK-1 |
|---|---|---|
| Dry crock | 7.8 | 8.4 |
| Wet crock | 12.4 | 35.6 |

From Table 9 it becomes clear that the amine functionalized siloxane resin particles according to the present invention also give excellent physical properties in textile applications at significantly lower curing temperatures compared to conventional thermal fixation temperatures of 150 to 160° C.

The invention claimed is:

1. An amino functionalized siloxane resin particle obtainable by polycondensation of a cationic alkoxysilane surfactant according to Formula I and an amino functionalized alkoxysilane according to Formula II:

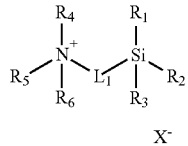

Formula I wherein:

$R_1$ to $R_3$ are each independently selected from the group consisting of an alkoxy group, a substituted or unsubstituted alkyl group, a substituted or unsubstituted alkenyl group, a substituted or unsubstituted alkynyl group, a substituted or unsubstituted alkaryl group, a substituted or unsubstituted aralkyl group, and a substituted or unsubstituted aryl or heteroaryl group, with the proviso that at least one of $R_1$ to $R_3$ represents an alkoxy group;

$R_4$ and $R_5$ are each independently selected from a substituted or unsubstituted alkyl group, a substituted or unsubstituted alkenyl group, a substituted or unsubstituted alkynyl group, a substituted or unsubstituted alkaryl group, a substituted or unsubstituted aralkyl group, and a substituted or unsubstituted aryl or heteroaryl group;

$R_6$ represents a group comprising a hydrocarbon group having at least eight carbon atoms;

Any of $R_4$ to $R_6$ may represent the necessary carbon atoms to form a five to eight membered ring;

$L_1$ represents a divalent linking group having no more than 10 carbon atoms; and $X^-$ represents a counterion to compensate the positive charge of said cationic surfactant, and

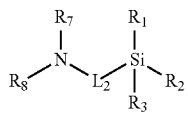

Formula II wherein:

$R_1$ to $R_3$ are each independently selected from the group consisting of an alkoxy group, a substituted or unsubstituted alkyl group, a substituted or unsubstituted alkenyl group, a substituted or unsubstituted alkynyl group, a substituted or unsubstituted alkaryl group, a substituted or unsubstituted aralkyl group, and a substituted or unsubstituted aryl or heteroaryl group, with the proviso that at least one of $R_1$ to $R_3$ represents an alkoxy group;

$R_7$ and $R_8$ are each independently selected from the group consisting of a hydrogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group, and a substituted or unsubstituted aryl or heteroaryl group, or $R_7$ and $R_8$ may represent the necessary atoms to form a five to eight membered ring; and $L_2$ represents a divalent linking group having no more than 10 carbon atoms.

2. The amino functionalized siloxane resin particle of claim 1, wherein $R_1$, $R_2$ and $R_3$ represent a $C_1$ to $C_6$ alkoxy group, $R_4$ and $R_5$ represent a $C_1$ to $C_6$ alkyl group, $R_6$ represents an unsubstituted alkyl group having at least ten carbon atoms, at least one of $R_7$ and $R_8$ represent a hydrogen, and $L_1$ and $L_2$ represent an unsubstituted alkylene group or an unsubstituted arylene group.

3. An aqueous dispersion comprising the amino functionalized siloxane resin particle as defined in the claim 2.

4. A jettable aqueous liquid comprising the dispersion as defined in claim 3.

5. The jettable aqueous liquid of claim 4, further comprising a component capable of aggregating components in an aqueous inkjet ink.

6. The jettable aqueous liquid of claim 4, further comprising a resin.

7. The amino functionalized siloxane resin particle of claim 1, wherein $R_1$, $R_2$ and $R_3$ represent a methoxy or ethoxy, $R_4$ and $R_5$ represent a $C_1$ to $C_6$ alkyl group, $L_1$ and $L_2$ represent a propylene group, $R_6$ represents an unsubstituted alkyl group having at least twelve carbon atoms, $R_7$ and $R_8$ represent a hydrogen.

8. An aqueous dispersion comprising the amino functionalized siloxane resin particle as defined in the claim 7.

9. A jettable aqueous liquid comprising the dispersion as defined in claim 8.

10. The jettable aqueous liquid of claim 9, further comprising a component capable of aggregating components in an aqueous inkjet ink.

11. The jettable aqueous liquid of claim 9, further comprising a resin.

12. An ink set for inkjet printing comprising an aqueous inkjet ink comprising a colorant and a water-soluble organic solvent and the jettable aqueous liquid according to claim 9.

13. An aqueous dispersion comprising the amino functionalized siloxane resin particle as defined in the claim 1.

14. A jettable aqueous liquid comprising the dispersion as defined in claim 13.

15. The jettable aqueous liquid of claim 14, further comprising a component capable of aggregating components in an aqueous inkjet ink.

16. The jettable aqueous liquid of claim 14, further comprising a resin.

17. An ink set for inkjet printing comprising an aqueous inkjet ink comprising a colorant and a water-soluble organic solvent and the jettable aqueous liquid according to claim 14.

18. The ink set for inkjet printing of claim 17, wherein the aqueous inkjet ink further comprises a resin.

19. The ink set for inkjet printing of claim 18, wherein the resin is a capsule, comprising a polymeric shell surrounding a core, the core comprising an oligomer or polymer having at least 3 repeating units comprising a functional group according to Formula III, IV, or V:

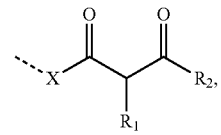

Formula III

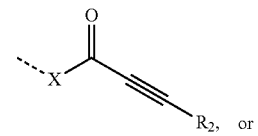

Formula IV

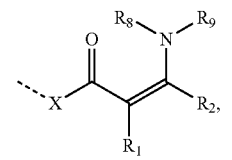

Formula V wherein $R_1$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, $COR_3$, and CN;

$R_2$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, and $COR_3$, or $R_1$ and $R_2$ may represent the necessary atoms to form a five to eight membered ring;

$R_3$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, $OR_4$, and $NR_5R_6$;

$R_4$ is selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group;

$R_5$ and $R_6$ are each independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group, or $R_5$ and $R_6$ may represent the necessary atoms to form a five to eight membered ring;

X is selected from the group consisting of O and $NR_7$;

$R_7$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group; and $R_8$ and $R_9$ are each independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group, or $R_8$ and $R_9$ may represent the necessary atoms to form a five to eight membered ring.

20. An image recording method comprising the steps of:
a) jetting the ink set as defined in claim 17 onto a substrate to form an image; and
b) drying the jetted ink set by applying heat to obtain a temperature of the image of at least 60° C.

* * * * *